April 10, 1928.  1,665,692

O. H. ENSIGN

VARIABLE DISCHARGE PUMP

Filed April 8, 1925   2 Sheets-Sheet 1

Witness
C. C. Holly

Inventor
Orville H. Ensign
by James R. Townsend
his atty.

April 10, 1928.  1,665,692

O. H. ENSIGN

VARIABLE DISCHARGE PUMP

Filed April 8, 1925  2 Sheets-Sheet 2

Inventor
Orville H. Ensign
by
James R. Townsend
his atty.

Witness
C. C. Holly

Patented Apr. 10, 1928.

1,665,692

UNITED STATES PATENT OFFICE.

ORVILLE H. ENSIGN, OF PASADENA, CALIFORNIA, ASSIGNOR TO ENSIGN CARBURETOR COMPANY, OF LOS ANGELES, CALIFORNIA, A CORPORATION OF CALIFORNIA.

VARIABLE-DISCHARGE PUMP.

Application filed April 8, 1925. Serial No. 21,552.

An object of this invention is to provide simple, positive and certain micrometric means whereby a wide range of variation down to microscopic quantities at the small discharge rate of any liquid may be obtained.

An object is to provide means for accurately determining the exact quantity of lubricating oil which may be furnished under pressure for any purpose such as high pressure bearings in any kind of machine, but especially to the wearing surfaces of high pressure internal combustion or steam engines.
An object is to provide pump means that may be adjusted to furnish positively measured portions of fuel to the cylinders of internal combustion engines irrespective of the size of cylinder or the quantities necessary to furnish proper combustion at light loads and with extremely small cylinders.

Heretofore great difficulty has been encountered in the operation of small internal combustion engines of Diesel or semi-Diesel type, and such types of engines have been measurably limited to rather large cylinders by the previous types of pumps. This defect was largely due to the difficulty in controlling the quantity of fuel at the lighter loads with great precision. Such precision can be had by manual adjustment under control of the operator through the medium of certain mechanism which I have invented for the purpose.
An object is to build a much cheaper pump for heavy duty Diesel or automotive type of engines, and to make such pump self-lubricating and non-leaking and free from stuffing boxes.
Another object is to provide a pump of this character which will not become air bound and to so construct such pump that any air that does reach the pump will quickly be discharged.
The invention is broadly new, basic and pioneer in that the means for accomplishing the accurate measuring of quantities of fuel discharge is obtained by providing and suitably manipulating means for rotatably adjusting in its barrel, a plunger having a beveled or miter end in relation to a port in said barrel to shear off the entering liquid, and to supply such liquid from a constant level supply chamber. I provide means for accurately adjusting the beveled end of the plunger to properly time the beginning of discharge of the liquid when operating the pump at full stroke, and I also provide simple means for returning leakage from the pump plungers to the original constant level chamber.

An object is to facilitate the assembly and repair of the pump.

The invention may be variously applied for use with a single plunger or with any number of plungers and may be constructed with any form of attachment of governors or other appliances, all of which are readily understood in the art and will not be detailed herein.

The plungers may be operated by any suitable mechanical contrivance and will be shown herein as operated respectively by suitable cams.

The pump herein shown and described is a continuation in part of my co-pending application, filed August 24, 1920, Serial No. 405,720, for improvement in automotive art, Patent #1,536,780.

Other objects, advantages and features of invention may appear from the accompanying drawings, the subjoined detail description and the appended claims.

The accompanying drawings illustrate the invention.

Figure 1:
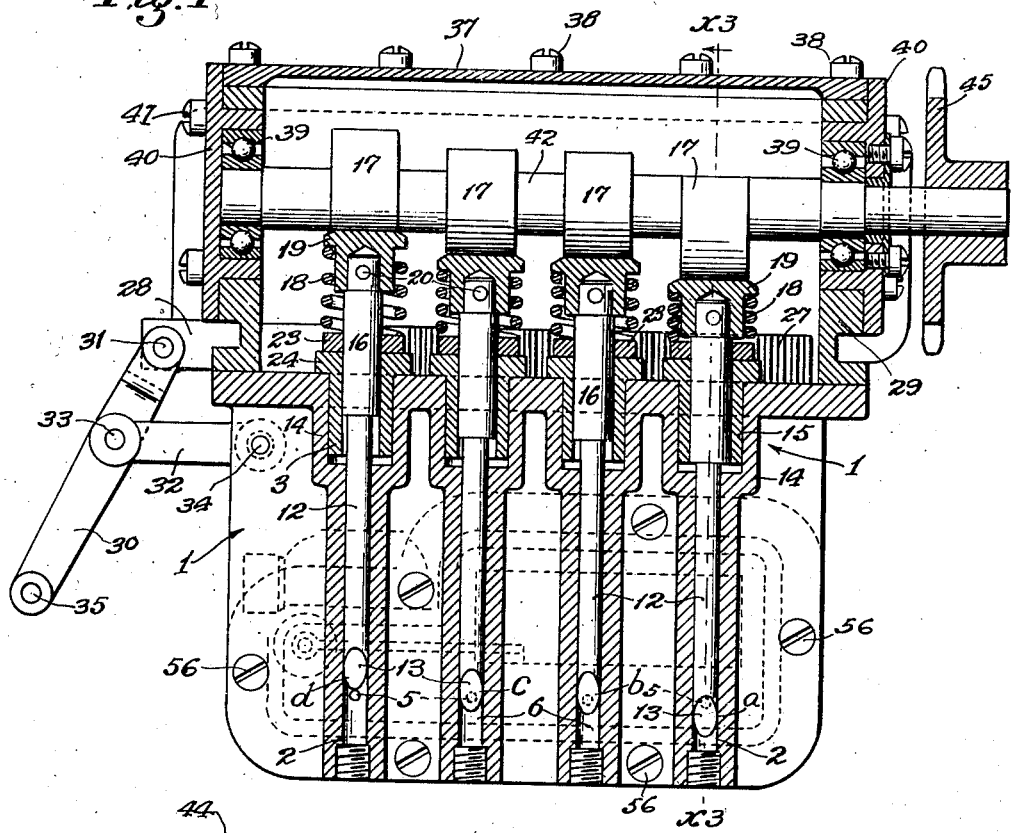
Figure 1 is a mid-section of a fuel pump constructed in accordance with my invention, as applied for use in connection with a four cylinder engine. The section is taken longitudinally of the cam shaft and plungers on line $x^1$, Figs. 2 and 3.
Figure 2:
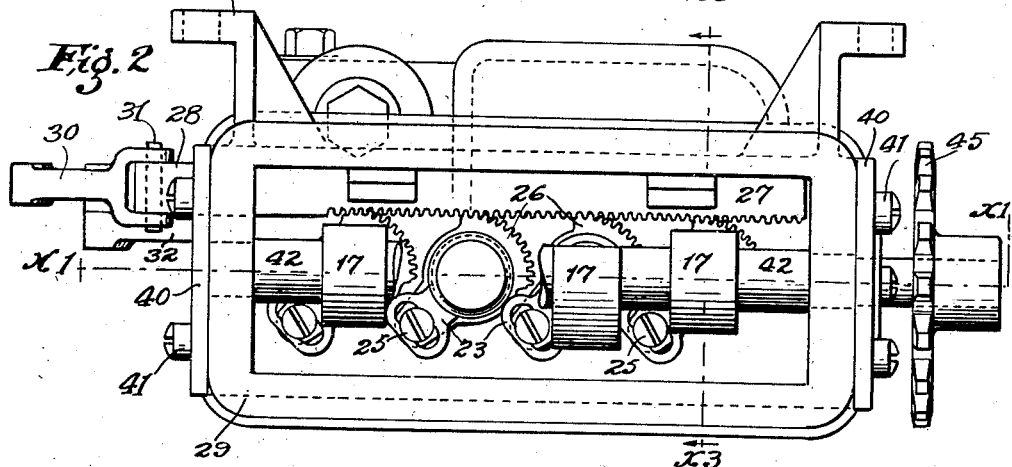
Fig. 2 is a plan view, with the cover to the cam shaft chamber removed, and a portion of the cam shaft is removed to expose the top of one of the plungers and its adjusting means.

In the form shown in the drawings the pump frame is a single casting comprising a head 1 provided with the desired number of barrels formed with a plunger chamber 2, and a guide bearing 3. Said pump frame is also provided with a supply chamber 4 communicating through a suction port 5 with a pump bore 6 from which the discharge port 7 opens, and such port 7 is located transversely opposite the inlet bore 5; said frame is also provided with a valve chamber 8 to accommodate a check valve 9 for closing the outlet port 7. A spring 10 is held in place by a union 11 to hold the valve 8 seated to close the outlet bore 7. A pump plunger 12 tightly fits the bore 6.

The plunger 12 is provided with a beveled or mitered end affording a plane oblique face 13 adapted to form a cut off for the inlet port 5 depending upon the rotative position of such plunger, this plane being so located that with the plunger in its lowest position it may be rotated to completely cut off the suction port 5 or to completely open the same with the fraction of a revolution of the plunger without closing the outlet port 7.

The diameter of the inlet 5 is preferably but a fraction of the diameter of the bore 6, thus to accommodate the pump to the operation of the plunger, and to form only a small leakage edge when it is closed. If this suction hole is too large with reference to the plunger diameter there is but a limited range of control of fuel.

The upper portion of the pump bore is enlarged at 14 to accommodate a guide 15 for an upper enlarged portion 16 of the plunger 12 to furnish bearing surface and to take the thrust of a cam 17 that depresses the plunger against the yielding resistance of spring 18 through a bearing cap 19 which is pinned to the plunger by means of a pin 20. The enlarged portion 16 of the plunger 12 is provided with a key-way 21, which is engaged by means of a fixed key 22 in the adjusting plate 23 which is movably mounted upon an upper flanged portion 24 of the guide 15 and is adjustably attached thereto by means of a screw 25.

The flange portion 24 of the guide 15 is also provided with a sector of a gear 26 which is arranged to mesh with a rack 27 which operates longitudinally and engages the sectors 26 of all the plungers.

The rack 27 has one end 28 which projects through the cam shaft case 29 and is movably connected to a lever 30 through a pin 31; the lever 30 being connected through a link 32 and pins 33, 34, with the pump frame 1 to form a fulcrum for operating the rack 27. Said lever may be operated through any suitable means connected at a pin hole 35. Bearing plates 27' secured to the cam shaft case 29 by screws 27" form bearings for the rack 27 and maintain such rack in operative position with the gears 26.

The cam shaft case 29 is open top and bottom and bolted to the pump frame by means of bolts 36 and is covered at the top by means of a cover 37 held in place by cap screws 38. Each end of this cam shaft case 29 is provided with ball bearings 39 held in place by a plate 40 and cap screws 41. A cam shaft 42 operates in the ball bearings 39 to drive the cams 17 which are shown as eccentrics formed on the shaft 42 and said cams engage the bearing caps 19 and operate to depress the pump plungers 12 against the tension of the springs 18, which return the plungers when rotation of the cams permit.

The cam shaft case 29 is provided with a bracket 44 for supporting the completed pump in any suitable position on an engine or other apparatus. The cam shaft 42 is provided with a sprocket 45 for suitable attachment to any portion of any moving machinery with which the pump may be used to thus rotate the shaft.

The supply chamber 4 is provided with an inlet 46 by means of which any suitable connection can be made to any sort of supply tank. This connection communicates through a strainer 47 to a valve cage 48 and a valve 49 to regulate the level of the liquid in the supply chamber 4 through the medium of a lever 50 and a float 51 attached to a fulcrum pin 52 to close the valve 49 when the liquid has reached the desired height in the supply chamber 4. The valve cage 48 is threaded into the supply chamber 4 at 53 and the upper end of the cage is threaded at 54 to receive the nut 55 to hold the fuel connection 46 in position. The fuel supply chamber 4 is held in position on the flange frame 1 by means of screws 56.

Means are provided whereby any leakage from around the pump plungers 12 will be returned to the constant level chamber 4, and such means comprise a passage 99 leading from the bottom of the guide bearing 3 to the chamber 4. It is apparent that any liquid that may leak by the plungers 12 will accumulate in the bottom of the guide bearing 3 and be returned by gravity to the chamber 4 through the passage 99.

In practical operation the pump will be driven through means of the sprocket 45 or other suitable means to the correct speed to time it for the purpose involved. Cams will be mounted at different radial positions on the cam shaft 42 to give the desired timing of the impulse from each pump plunger discharge. The pump will be assembled and the gear 26 properly meshed with the rack 27, but for equal timing of the relation of the discharge of the individual pump cylinders the position of the key 22 with reference to the rack 27 and cut-off face 13 can be accurately adjusted by means of the plate 23 and the screw 25. The pump being properly assembled and timed, and with the cam shaft in rotation, the rack 27 moving through the medium of the lever 30 will cause rotation or oscillation of the plunger 12 through the desired angle necessary to control the pressure displacement in the individual pump cylinders.

Figure 3:
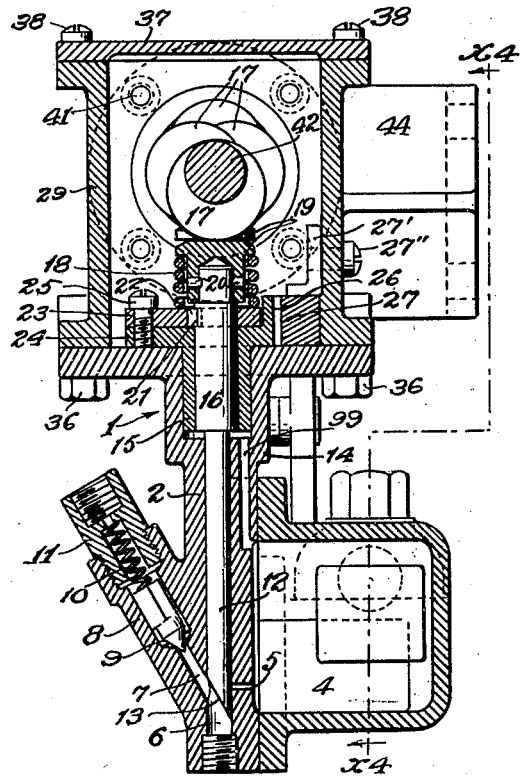
Fig. 3 is a section on line $x^3$, Figs. 1 and 2.
Figure 4:
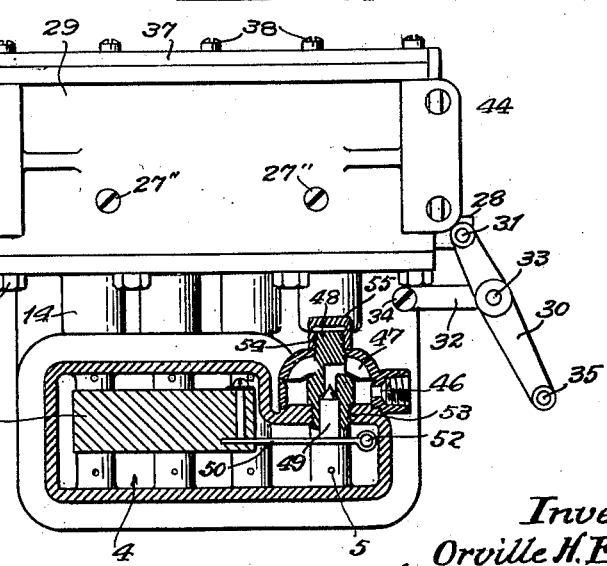
Fig. 4 is what may be termed a rear elevation on small scale, with fuel chamber shown in vertical longitudinal section on line $x^4$, Fig. 3.

This is accomplished by the variable point of cut-off of the suction inlet 5 to the pump cylinder which occurs with different angular positions of the beveled surface 13. In Fig. 3 the pump plunger is shown in its lowest position and with the position of the rack such that it will give the maximum amount of liquid discharge per stroke. That is to say, that the plunger being turned to a position where it will close the suction inlet port 5 at the earliest possible position in its downward stroke. This is illustrated by the different positions of $a$, $b$, $c$, $d$; $d$ is in the extreme upward position which shows the position in which the fuel is flowing into the pump cylinder 6. As the plunger descends the excess fuel which has rushed in to fill the vacuum formed by the lifting of the plunger is forced out the suction inlet 5 until the point of the plunger has passed the port 5 sealing it against further discharge of fuel back to the supply chamber 4. Further downward movement, until the plunger has reached the lower position shown by the plunger $a$, forces the liquid to the desired point of use through the check valve 9, and a connection, not shown, that may be secured to union 11.

If, however, the plungers are turned through an angle ever so small from the one shown on the drawings the time of point of closure of the suction port 5 is delayed and during a longer portion of the travel the liquid will be discharged back through 5 until it can be seen that were the plunger rotated through 180° no liquid at all would be forced through the check valve 9 as it would all go back into the supply chamber 5 and it can therefore be seen that at any point between these two positions a relatively fractional amount of liquid will be discharged through the check valve 9 making it possible to control the charge of the mass of liquid passed through the check valve from full capacity of the plunger stroke after closing the port 5 to any small amount down to absolutely the zero flow. This is accomplished with extreme accuracy because after the plunger passes the port 5 there is no possible chance for any more liquid to get in and very small possibility of any leakage.

It will be apparent that my invention may be used to force lubricant or liquid fuel to engines, or may be used for any purpose where a pump is desired to force liquid to a distant point.

I claim:

1. In a pump comprising a cylinder having inlet and discharge ports and a reciprocating plunger formed with an oblique face and adapted to form a cut-off for said inlet port; and rack and gear means to effect and maintain a rotative adjustment of the plunger with relation to the inlet port.

2. The combination with a cylinder having a reduced port on one side and a larger port on the other side, a plunger having an oblique face at its end and adapted to operate in said cylinder to cut off the inlet port and to force liquid out of the outlet port; a check valve for the outlet port; means to reciprocate the plunger; means fixed to the plunger; and means adapted to be manually operated to control said fixed means and rotate the plunger.

3. In a pump comprising a barrel having a bore, a plunger in said bore, said bore having inlet and discharge ports, a supply chamber communicating with said inlet port, an oblique face on said plunger adapted to form a variable cut-off for said inlet port, a gear on said plunger; and means engaging said gear to rotate said gear and plunger to vary the time of cut-off of said inlet port.

4. In a pump comprising a barrel having a bore, a plunger in said bore, said bore having inlet and discharge ports, a supply chamber communicating with said inlet port, an oblique face on said plunger adapted to form a cut-off for said inlet port, a gear on said plunger; means engaging said gear to rotate said gear and plunger to vary the time of cut-off of said inlet port; and means to rotatably adjust said plunger in said gear to time the delivery of liquid from the pump.

5. In a pump comprising a barrel having a bore, a plunger in said bore, said bore having inlet and discharge ports, a supply chamber communicating with said inlet port, an oblique face on said plunger adapted to form a cut-off for said inlet port, a gear on said plunger; a rack engaging said gear, and means to reciprocate said rack to rotate said gear and plunger, to vary the time of cut-off of said inlet port.

6. In a pump comprising a barrel having a bore, a plunger in said bore, said bore having inlet and discharge ports, a supply chamber communicating with said inlet port, an oblique face on said plunger adapted to form a cut-off for said inlet port, a gear on said plunger; means engaging said gear to rotate said gear and plunger to vary the time of cut-off of said inlet port; a cam engaging said plunger, means to rotate said cam; and spring means acting to return said plunger.

7. In a pump comprising a barrel having a bore, a plunger in said bore, said bore having inlet and discharge ports, a supply chamber communicating with said inlet port, an oblique face on said plunger adapted to form a cut-off for said inlet port, a gear on said plunger; means engaging said gear to rotate said gear and plunger to vary the time of cut-off of said inlet port; an adjusting plate secured to said plunger; and means adjustably securing said plate to said gear.

8. In a pump comprising a barrel having a bore, a plunger in said bore, said bore having inlet and discharge ports, a supply chamber communicating with said inlet port, an oblique face on said plunger adapted to form a cut-off for said inlet port, a gear on said plunger; means engaging said gear to rotate said gear and plunger to vary the time of cut-off of said inlet port; an adjusting plate secured to said plunger; said plate having a slot formed therein; and a set screw extending through said slot into said gear.

9. In a pump comprising a barrel having a bore, a reciprocating plunger in said bore, said bore having inlet and discharge ports, a supply chamber communicating with said inlet port, means whereby rotation of said plunger will vary the discharge of said pump, means to reciprocate said plunger, a guide bearing for said plunger; and means adjacent said guide bearing adapted to return the leakage past the plunger to the supply chamber.

10. In a pump comprising a barrel having a bore, a reciprocating plunger in said bore, said bore having inlet and discharge ports, a supply chamber communicating with said inlet port, means whereby rotation of said plunger will vary the discharge of said pump, means to reciprocate said plunger; and a guide bearing for said plunger; said plunger having an enlargement thereon, which extends through said bearing, said barrel having a passage therein extending from said bore adjacent said enlargement to said supply chamber.

In testimony whereof, I have hereunto set my hand at Los Angeles, California, this 2nd day of April, 1925.

ORVILLE H. ENSIGN.